(12) United States Patent
Colvin (10) Patent No.: US 7,231,890 B2
(45) Date of Patent: Jun. 19, 2007

(54) METHOD OF FILLING A BIRD FEEDER

(75) Inventor: Barry D. Colvin, Bristol, RI (US)

(73) Assignee: Aspects, Inc., Warren, RI (US)

( * ) Notice: Subject to any disclaimer, the term of this patent is extended or adjusted under 35 U.S.C. 154(b) by 194 days.

(21) Appl. No.: 11/199,057

(22) Filed: Aug. 8, 2005

(65) Prior Publication Data
US 2007/0028847 A1    Feb. 8, 2007

(51) Int. Cl.
*A01K 7/00*    (2006.01)
(52) U.S. Cl. .......................... 119/72; 119/74
(58) Field of Classification Search .............. 119/72, 119/51.01, 52.2, 74, 51.5, 57.9
See application file for complete search history.

(56) References Cited

U.S. PATENT DOCUMENTS

| | | | | |
|---|---|---|---|---|
| 3,913,527 A | * | 10/1975 | Kilham | 119/74 |
| 4,691,665 A | * | 9/1987 | Hefner | 119/77 |
| 5,269,258 A | * | 12/1993 | Brown | 119/57.9 |
| 5,454,348 A | * | 10/1995 | Colwell et al. | 119/72 |
| 7,168,392 B2 | * | 1/2007 | Kuelbs | 119/452 |
| 2006/0065202 A1 | * | 3/2006 | Fort et al. | 119/72 |
| 2006/0090707 A1 | * | 5/2006 | Donegan | 119/72 |

* cited by examiner

*Primary Examiner*—Kimberly S. Smith
(74) *Attorney, Agent, or Firm*—Barlow, Josephs & Holmes, Ltd.

(57) ABSTRACT

The present invention includes a method of filling a nectar bird feeder. The bird feeder includes a base with a nectar reservoir and an extension member that downwardly depends from the bottom surface thereof. A hanger is connected to the base and extends upwardly therefrom. A cover, which is releasably attached to the base, has a central aperture to receive the hanger therethrough. The cover is removed from the base and placed on a support surface. The base is then placed on the cover with the extension member being positioned through the aperture so it can be movably positioned so it is level for filling of the reservoir of the base with nectar. After filling, the base is removed from the cover and the cover is reattached to the base.

14 Claims, 10 Drawing Sheets

METHOD OF FILLING A BIRD FEEDER

BACKGROUND OF THE INVENTION

This invention relates generally to animal feeders and, in particular, bird feeders. More specifically, the method of the present invention relates to bird feeders of the nectar feed type, such as hummingbird, oriole and butterfly bird feeders and methods of filling such feeders.

Figure 1:
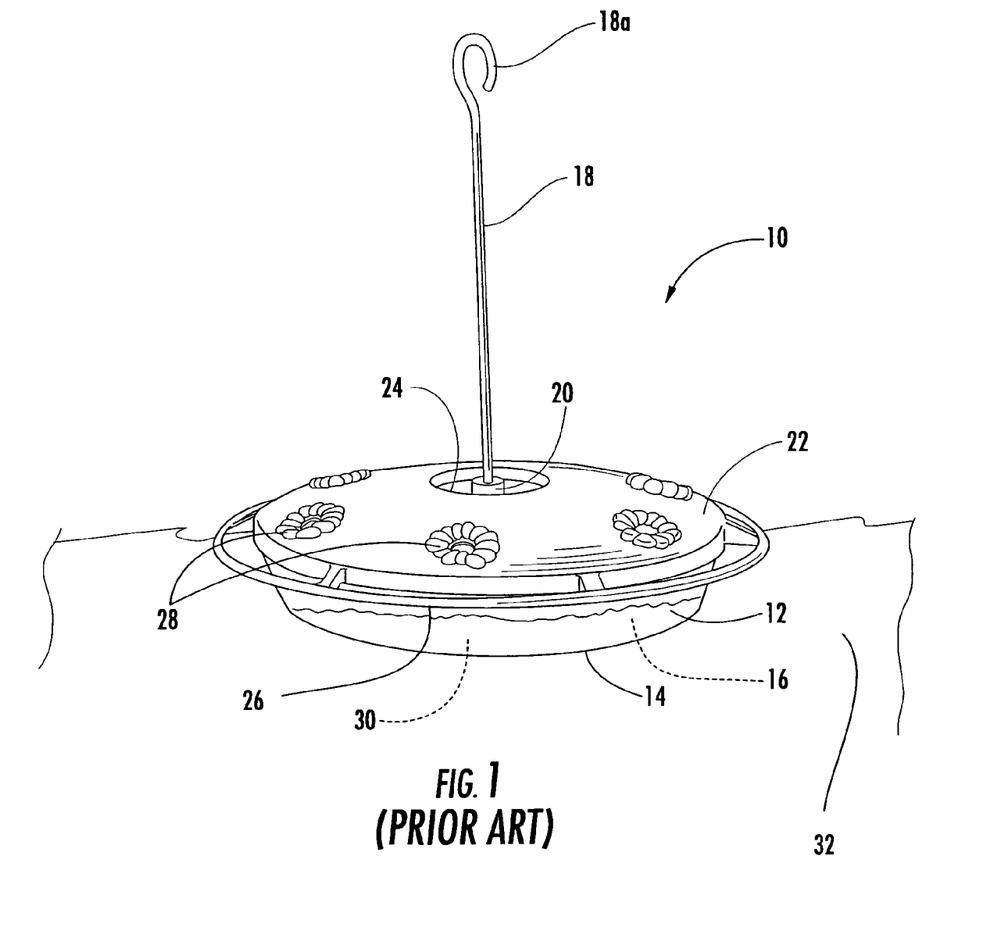
FIG. 1 is a front perspective view of a prior art nectar feeder.
Figure 2:
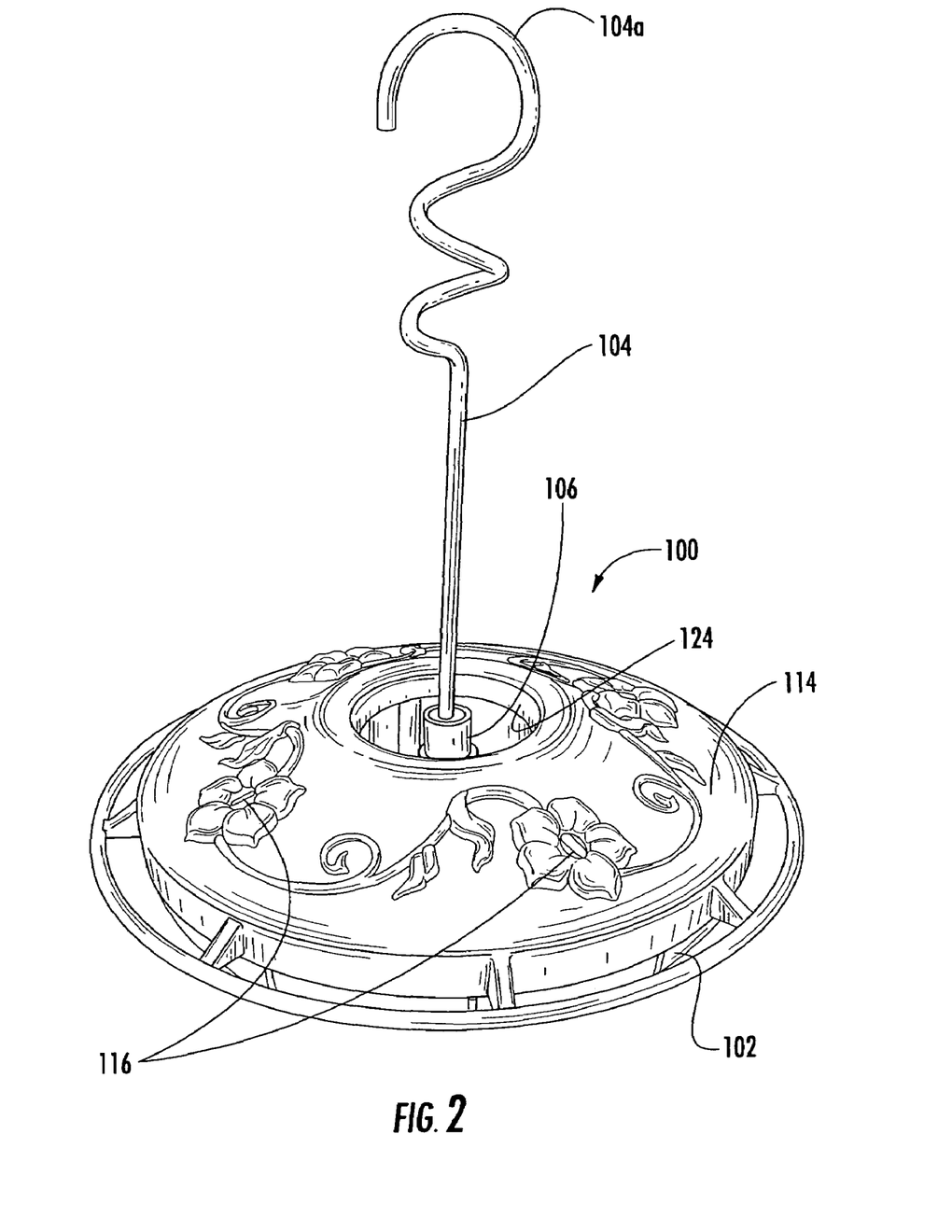
FIG. 2 is a top perspective view of a nectar bird feeder used to carry out the method of the present invention.
Figure 3:
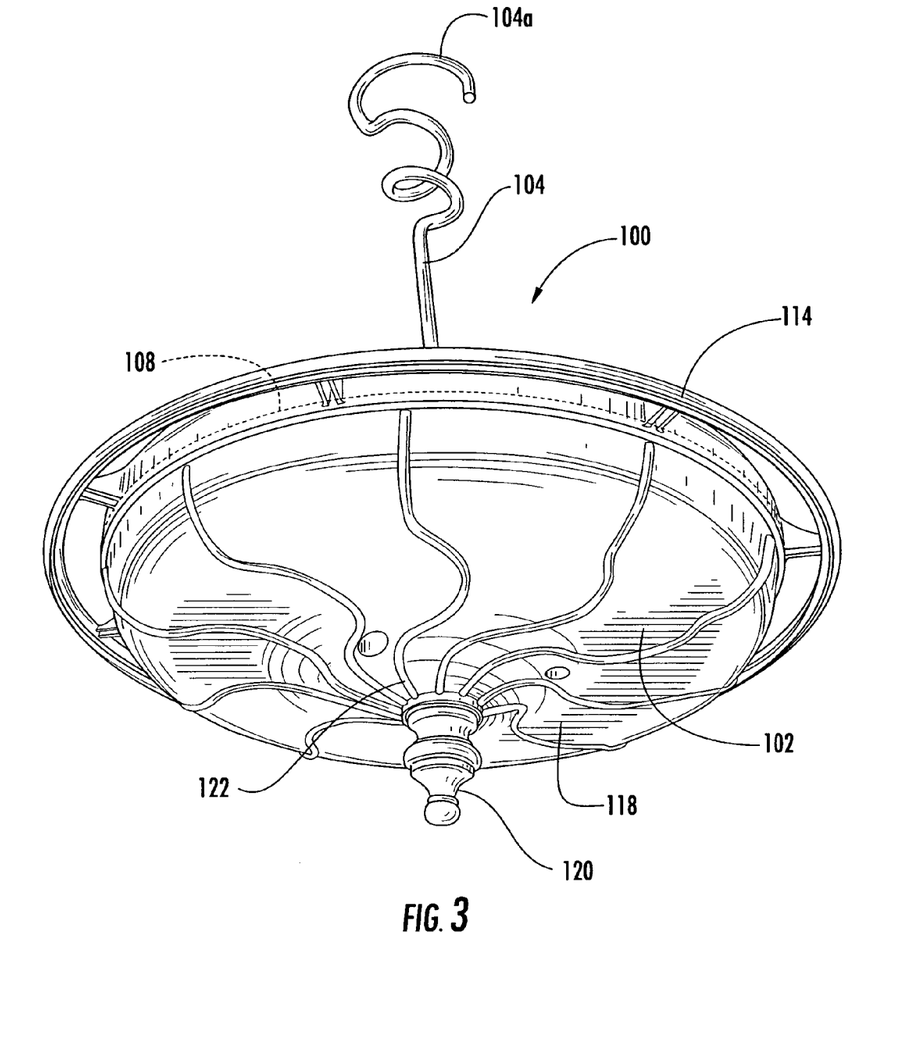
FIG. 3 is a bottom perspective view of the nectar bird feeder of FIG. 2.

Nectar feeders are very well known in the bird feeding field. As shown in FIG. 1, a typical prior art nectar feeder 10 includes a saucer-shaped base 12 that includes flat bottom surface 14 that serves as a floor for a reservoir trough 16 that is typically annular-shaped. A hanger 18 is typically connected, which can be removably connected, to a center area 20 in the middle of the ring-shaped reservoir 16. A cover 22 includes a center aperture 24 so that it can be easily placed over the hanger 18 into releasable engagement with the top open end 26 of the reservoir trough 16 of the base 12. Typically, the cover 22 is frictionally engaged with the base 12 so it can be easily removed when desired.

The cover 22 includes a number of feed ports 28 about the periphery thereof to permit a bird, such as a hummingbird, to access the nectar feed 30 therethrough. The feed ports 28 are commonly configured to appear as flowers and the cover 22 is typically of different colors depending on which type of birds are to be attracted to the feeder 10. Such configuration can be modified to attract different types of birds, as desired.

As can be understood, when the nectar 30 within the feeder 10 has been consumed, it must be re-filled so that more birds can feed. In accordance with the prior art method of filling the prior art feeder 10 of FIG. 1, the feeder 10 is first placed on a support surface 32 with the flat bottom surface 14 of the base 12 in communication with the support surface 32, which can be a table, for example. The cover 22 is then typically removed from the base 12 and routed over the hanger 18 to reveal the annular-shaped nectar feed trough 16. The hanger 18 can be removed before removal of the cover 22, if desired. Further details of the prior art feeder 10 of FIG. 1 need not be provided as this construction is well-know in the art.

Once the nectar feed trough 16 is exposed, nectar feed 30 can be poured therein in the amount desired, all while the base 12 of the feeder is lying flat on a support surface 32. When the feed trough 16 is preferably filled, the cover 22 is attached back onto the base 12. The cover 22 is routed over the hanger 18 if the hanger 18 was left connected to the base 12 or attached directly to the base 12 after which the hanger 18 can be re-attached. The entire feeder 10 can now be hung from a tree or post (not shown) via the hook 18a.

Prior art nectar bird feeders 10 can be easily filled because the bottom surface 14 of the base 12 is substantially flat which enables it to be placed level on a support surface 32. However, such a method of filling cannot be employed if the bottom surface 14 of the base 12 is not flat or substantially flat. As will be described below, it may be desirable to provide a base that is not flat or substantially flat where an ornamental or stabilizing member downwardly depends from the bottom surface of the base of the feeder. In such a case, the base of the feeder cannot simply be placed on a flat support surface, such as a table. Also, the appropriate support surface, to accommodate a non-flat bottom surface of the base, is typically not available.

Therefore, the prior art methods of filling a nectar feeder, that are employed for prior art feeders 10 with bases 12 with flat bottoms 14, cannot be used in feeders with that have a base bottom surface which are not flat or substantially flat. Thus, the prior art methods of filling nectar feeder suffer from various disadvantages that make them unusable with certain nectar feeders. Therefore, there is a need for a method of filling a nectar bird feeder that can accommodate a feeder with a base that has a non-flat bottom surface. There is further need for a method for filling a nectar bird feeder that is easy to carry out quickly and with little or no mess. There is yet a further need for a method of filling a nectar bird feeder that can accommodate a bird feeder with an ornamental or stabilizing member that downwardly depends from the bottom surface of the base member.

SUMMARY OF THE INVENTION

The present invention preserves the advantages of prior art bird feeders and methods of filling such feeder, such as nectar bird feeders. In addition, it provides new advantages not found in currently available feeders and related methods and overcomes many disadvantages of such currently available feeders and related methods of filling such feeders.

The invention is generally directed to a novel and unique method of filling a nectar bird feeder. The present invention includes a method of filling a nectar bird feeder. The bird feeder includes a base with a nectar reservoir and an extension member that downwardly depends from the bottom surface thereof. A hanger is connected to the base and extends upwardly therefrom. A cover, which is releasably attached to the base, preferably has a central aperture to receive the hanger therethrough. The cover is removed from the base and placed on a support surface. The base is then placed on the cover with the extension member being positioned through the aperture so it can be movably positioned and leveled for filling of the reservoir of the base with nectar. After filling, the base is removed from the cover and the cover is reattached to the base.

It is therefore an object of the present invention to provide a method of filling a bird feeder that is well-suited for nectar feeders.

It is an object of the present invention to provide a method of filling a bird feeder the facilitates such filling.

It is a further object of the present invention to provide a method of filling a bird feeder that reduces the mess associated with filling nectar bird feeders.

It is a yet further object of the present invention to provide a method of filling a bird feeder that facilitates the filling a feeder that has an extension member, such as an ornamental or balance member, depending downwardly from the bottom of the base of the feeder.

Another object of the present invention is to provide a method of filling a bird feeder that enables the feeder base to be stabilized during filling to reduce mess and cleanup and facilitate such filling.

It is a further object of the present invention to provide a method of filling a bird feeder that enables a nectar feeder with a downwardly depending ornamental member to be easily filled.

Another object of present invention is to provide a method of filling a bird feeder that enables a nectar feeder with a downwardly depending stabilizing member to be easily filled.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE PREFERRED EMBODIMENT

Figure 7:
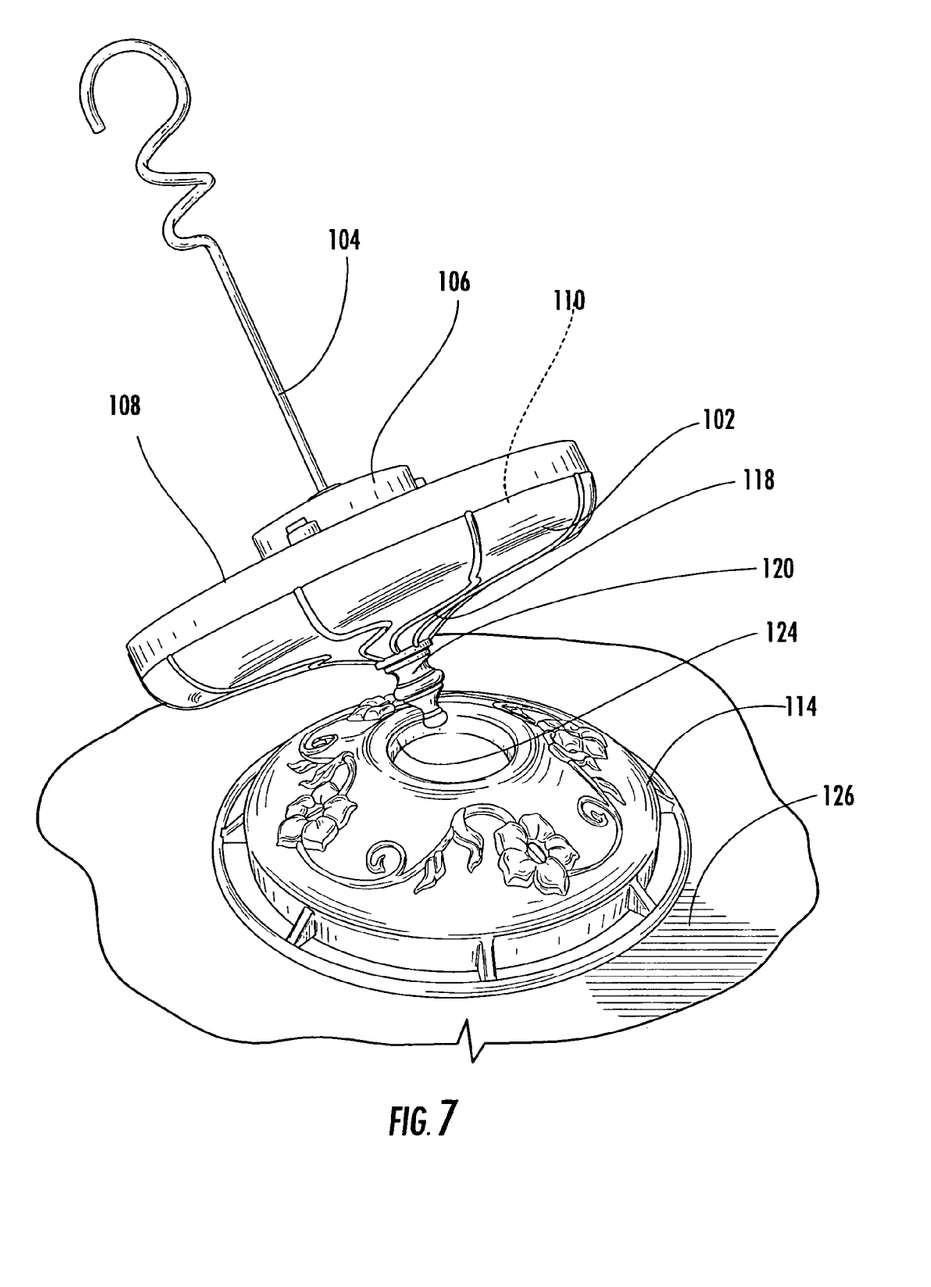
FIG. 7 is a perspective view of the base of the feeder of FIG. 2 in the process of being positioned on the cover in accordance with the method of the present invention.
Figure 8:
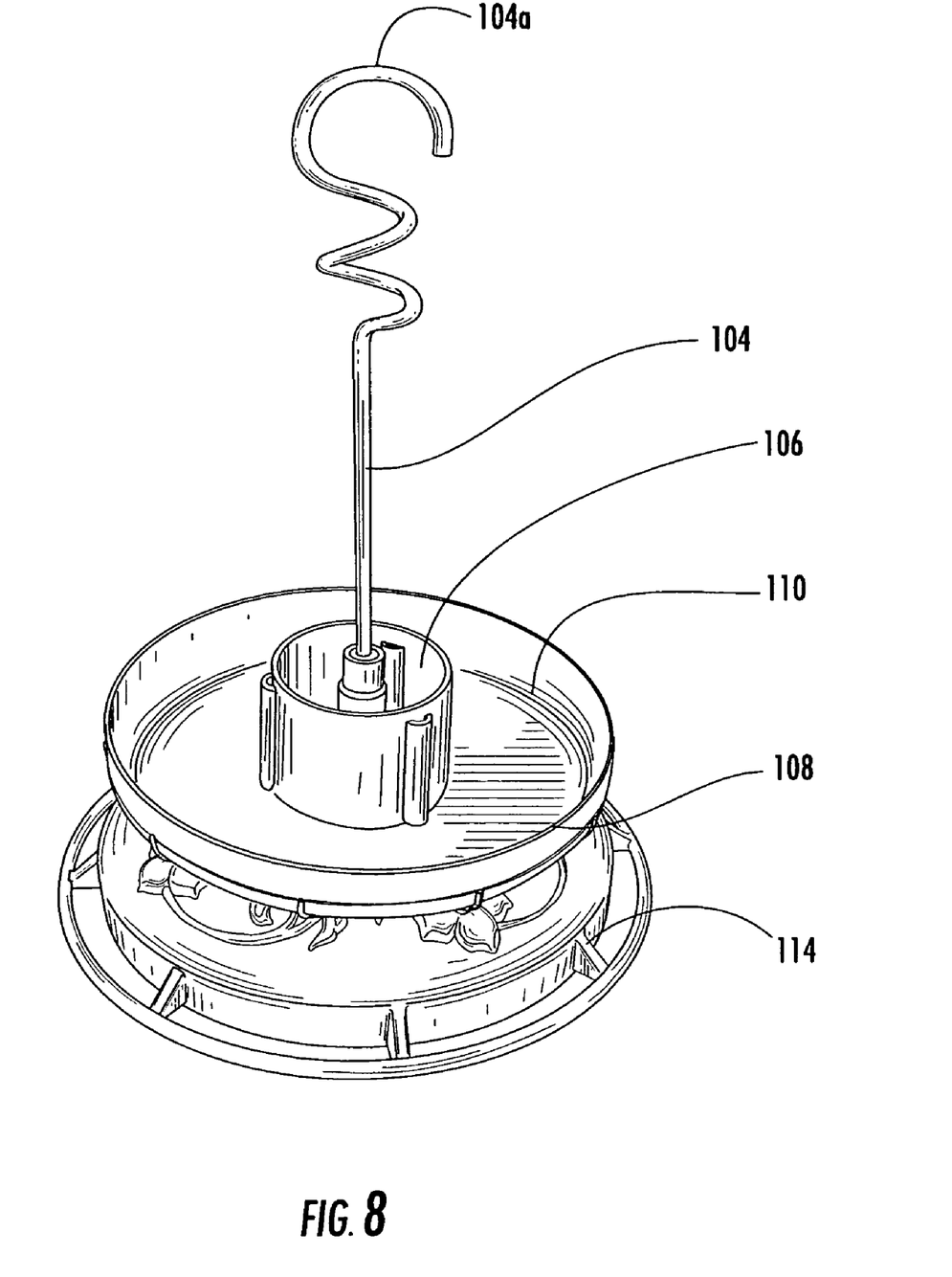
FIG. 8 is a perspective view of the base of the feeder of FIG. 2 resting on the cover in accordance with the present invention.
Figure 9:
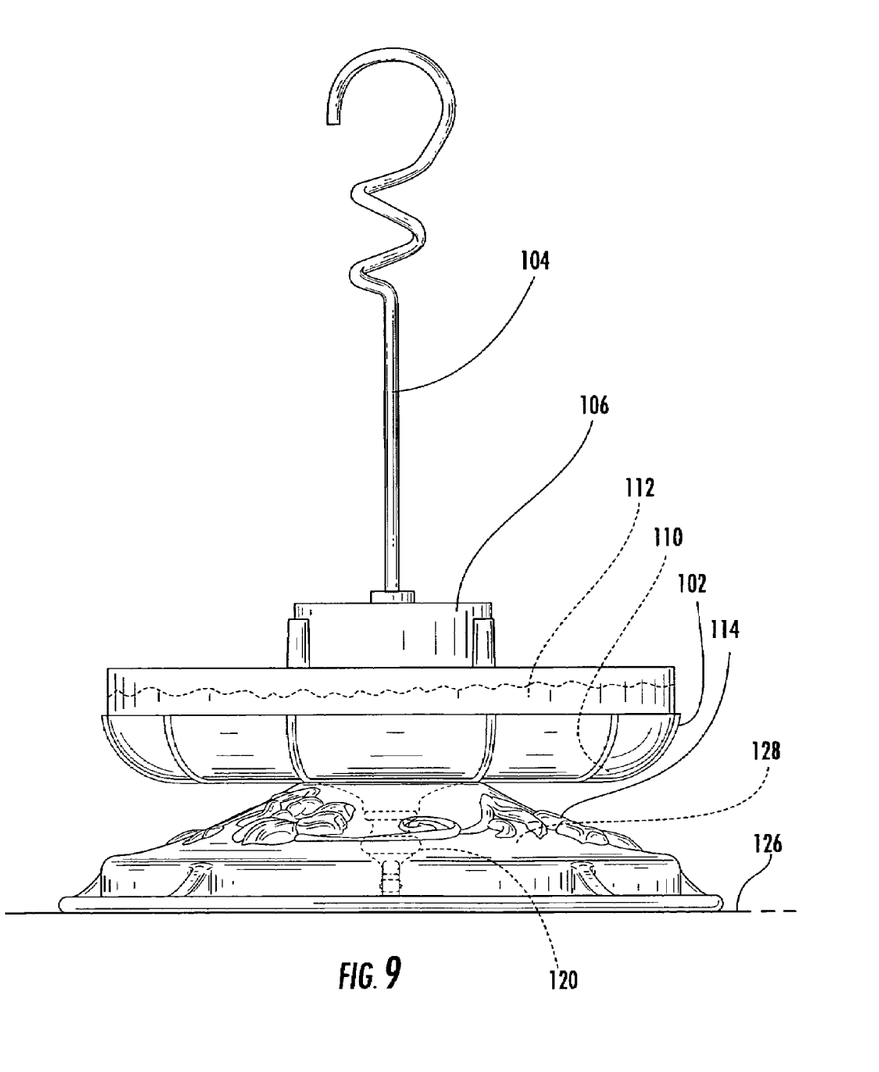
FIG. 9 is a side elevational view of the feeder in the condition as shown in FIG. 8.

In FIGS. 2-6, a bird feeder 100 used in the method of the present invention is shown. The feeder 100 includes a base 102 with a hanger 104 member detachably connected to a central region 106 thereof. For example, the hanger 104 can be threadably secured to the base 102. The base 102 includes a top open end 108 to form an annular-shaped trough 110, as best seen in FIGS. 7-9, for containing nectar feed 112.

A cover 114 is releasably secured to the base 102 at its top open end 108 to cover the trough 110 and protect the nectar feed 112 contained therein. A number of feed ports 116 are provided through the cover 114 to permit access to the nectar feed by the appropriate birds, such as hummingbird, orioles and butterflies, for example. The feed ports 116 are preferably configured to appear as flowers, or other structures, to further attract birds to the feeder 100. Further, the cover 114 can be of different colors, such as red, to attract the desired type of bird. As can be understood, the feed ports 116 are positioned over the nectar trough 110 so that feeding birds are aligned thereover for optimum access to the nectar 112 therein.

The feeder 100 of FIGS. 2-6 is unique in that, unlike the prior art feeder of FIG. 1, the bottom surface, generally referred to as 118, of the base 102 is not completely flat. In fact, it includes, for example, a downwardly depending structure 120 and optionally a sloped portion 122. The downwardly depending structure 120 can be an ornamental member that adds to the aesthetic appeal of the feeder 100 or a weighting member that adds centering weight below the bottom surface 118 of the feeder 100 to make the feeder 100 more stable in windy conditions, for example. This prevents the liquid nectar from undesirably splashing around inside the feeder 100. The member 120 can also serve a dual purpose and be aesthetically appealing as well. Furthermore, the bottom surface 118 of the base can be contoured to add further aesthetic appeal to the feeder 100. In general, this unique feeder 100 of the present invention includes a non-flat bottom base surface 118.

This non-flat bottom surface 118 is just one of many different types of non-flat bottom surfaces that the method of filling of the present invention can accommodate. For ease of illustration and description, the method will be described and shown in detail in connection with the feeder 100 of FIGS. 2-6 although it could be used for other configurations.

Figure 4:
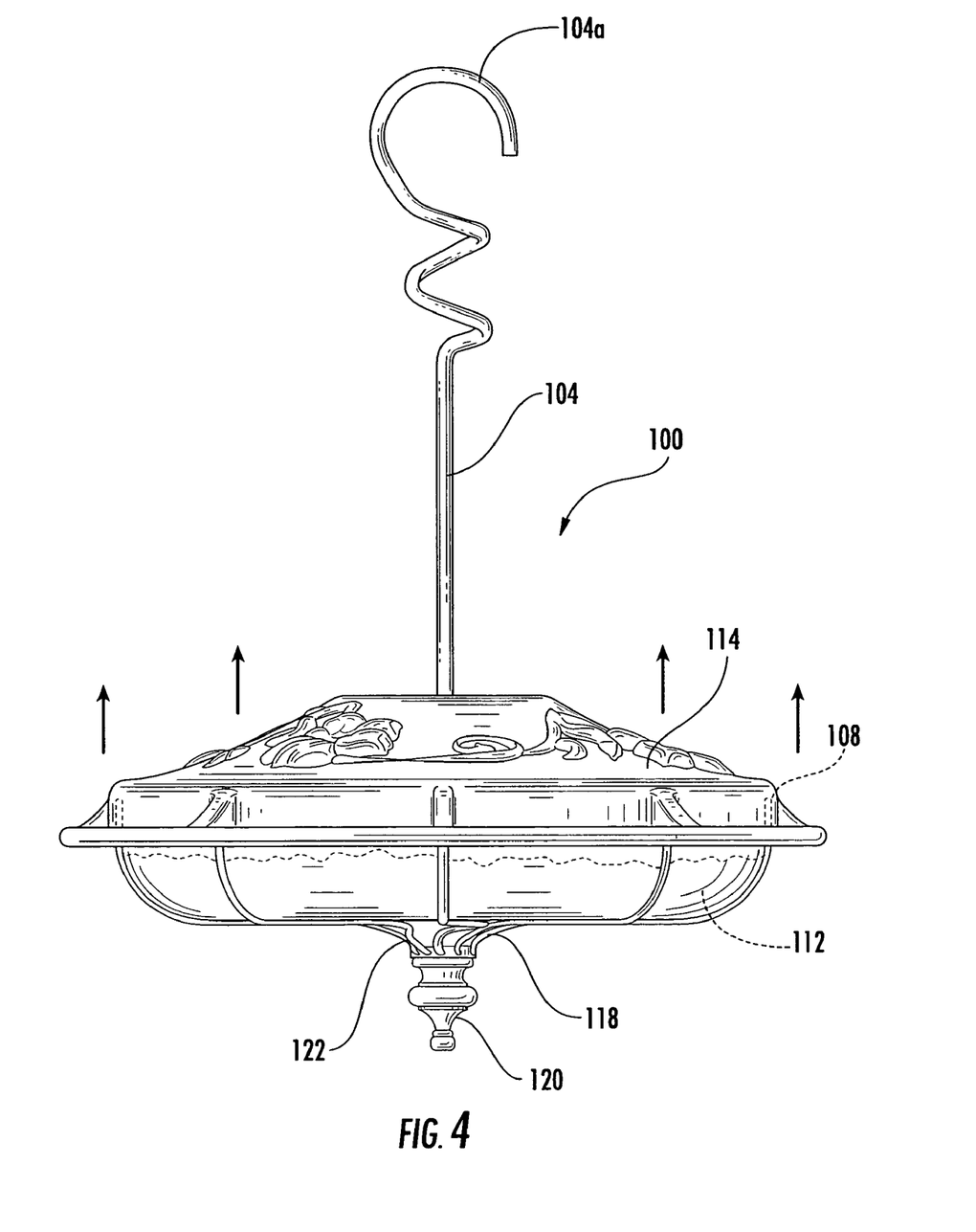
FIG. 4 is a side elevational view of the nectar feeder of FIG. 2.
Figure 5:
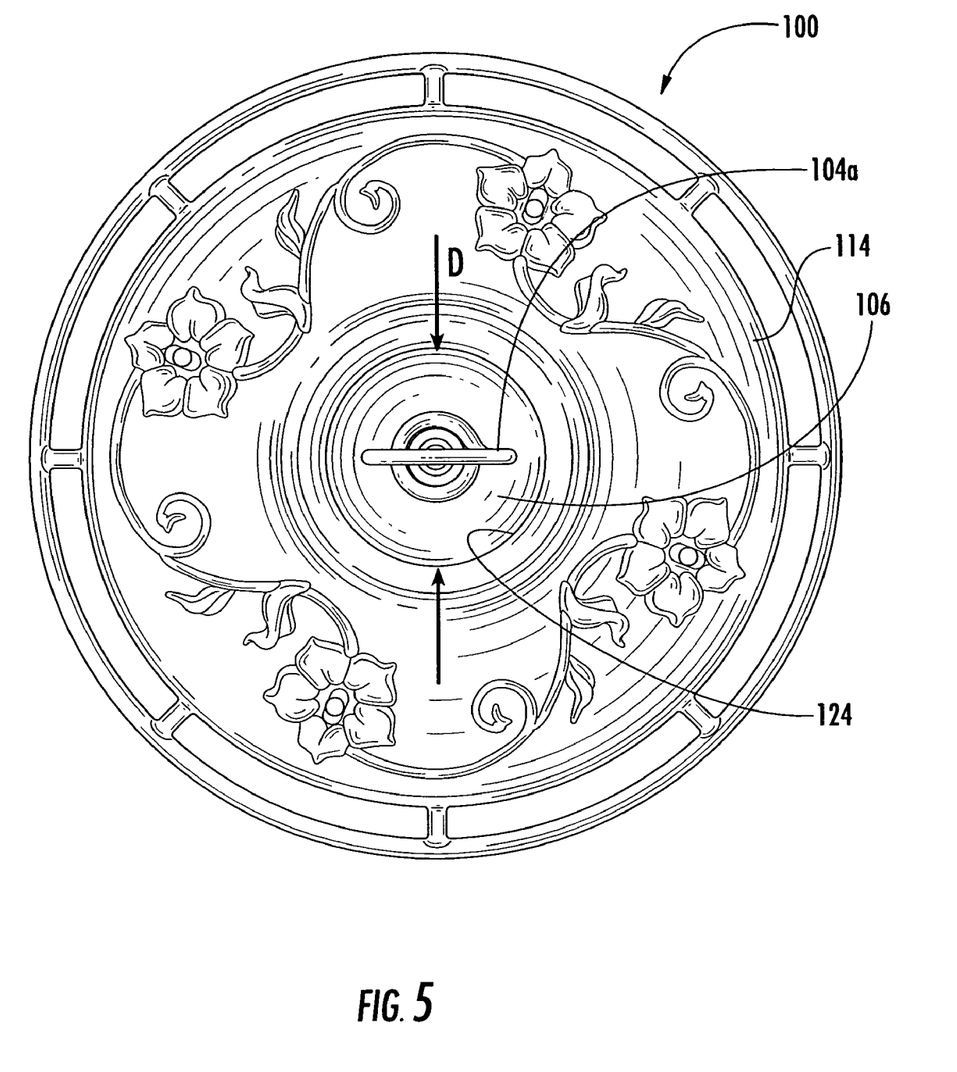
FIG. 5 is a top view of the feeder of FIG. 2.
Figure 6:
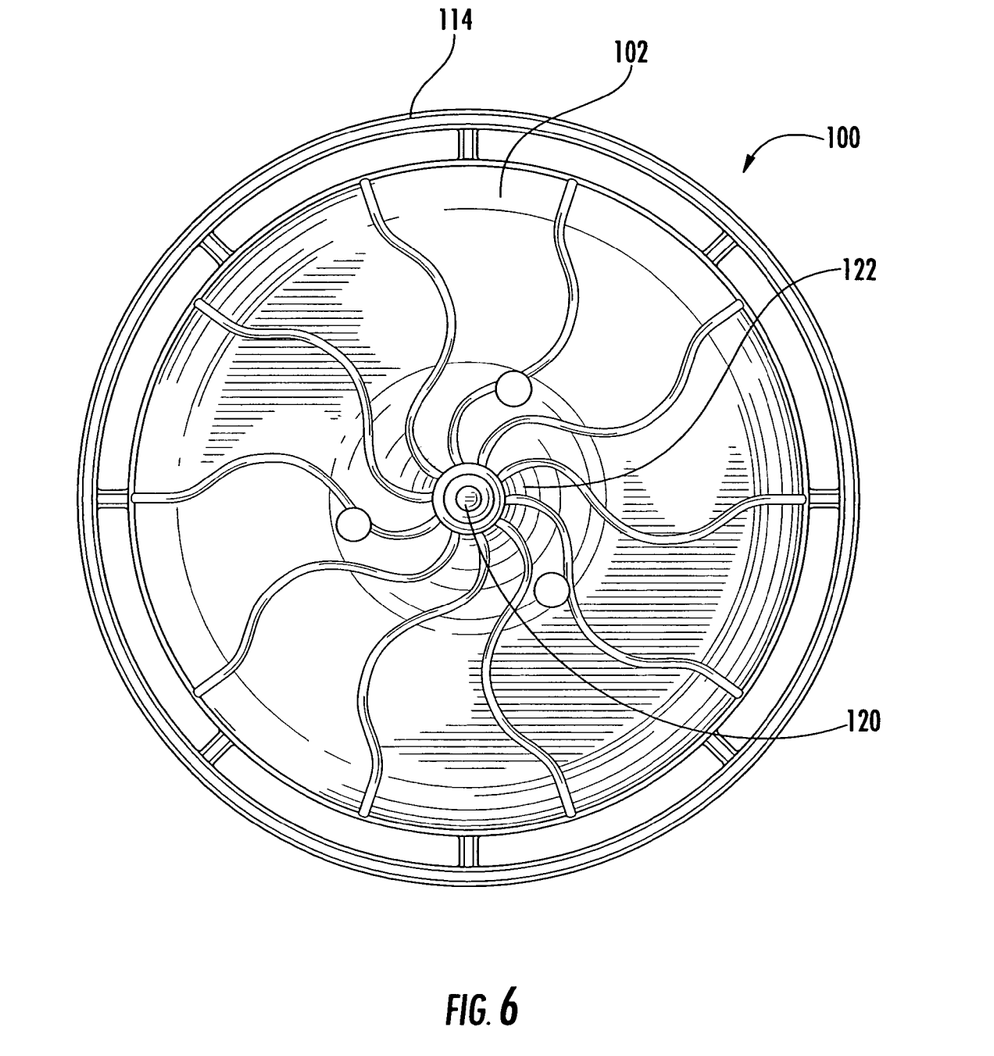
FIG. 6 is a bottom view of the feeder of FIG. 2.

Turning to FIG. 4, the method of the present invention is shown. The cover 114 is separated from the base 102. The cover 102 can be routed over the hanger 104 if the hanger 104 is optionally left attached to the center portion 106 of the base 102. The hanger 104 includes a hook portion 104a for attachment to a tree, post or the like (not shown). As can be seen in FIG. 5, the width of the hanger 104, which is largest at its hook 104a, is less than the diameter D of the aperture 124 in the cover 114 to permit the cover 114 to be easily removed without first detaching the hanger 104. However, the hanger 104 may be detached first, if desired. For example, the hanger 104 may be threadably connected to the center portion 106 of the base 102.

After the cover 114 is removed from the base 102, it is placed on a support surface 126, such as a table, as seen in FIG. 7. The support surface 126 is preferably level to ground to facilitate filling the trough 110 with nectar 112 but, in accordance with the present invention, it need not be perfectly level, as will be described below. Still referring to FIG. 7, the empty base 102 with nectar trough 110 is placed on top of the cover 114 which is now serving as a stand for securing the base 102 during the filling process. More specifically, the downwardly depending member 120 is inserted into the aperture 124 in the cover 114 so that it rests solidly and securely, as seen in FIGS. 8 and 9, with the bottom surface 118 of the base 102 in communication with the top surface of the cover 114.

Figure 10:
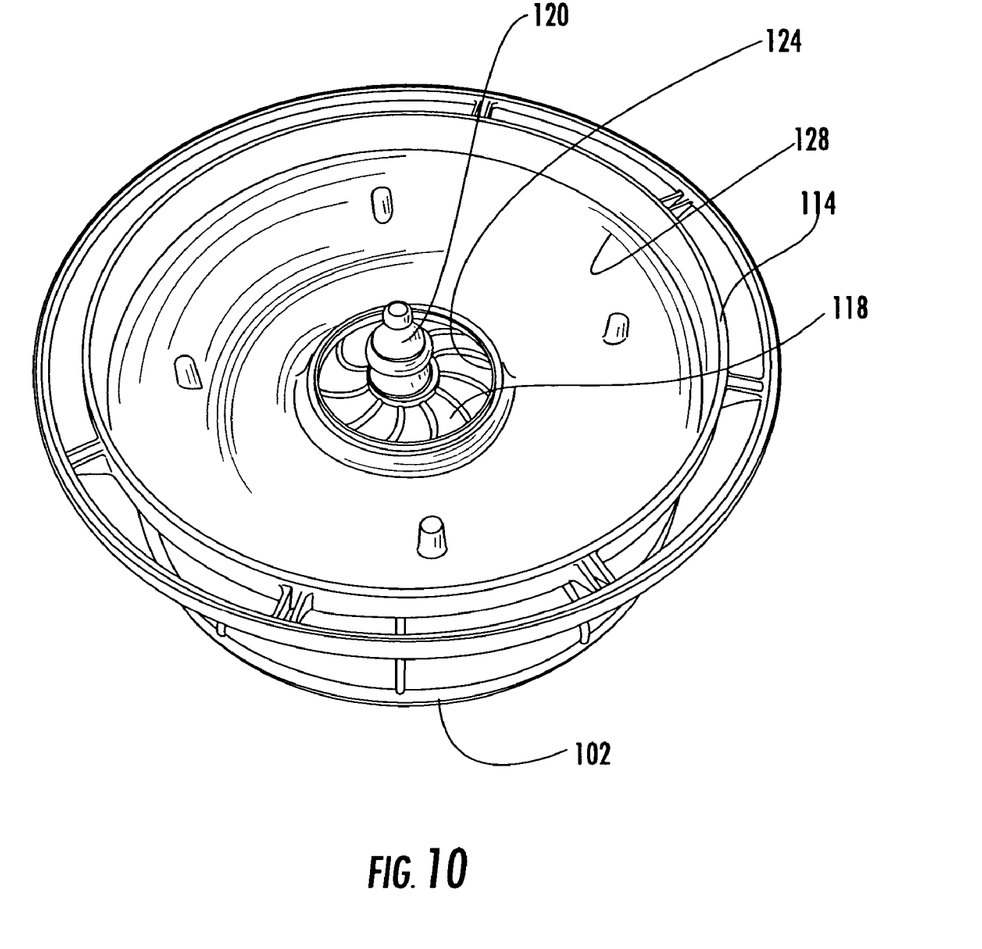
FIG. 10 is a bottom view of the feeder shown in FIG. 8.

In FIG. 9, a side elevational view of the feeder 100 during the step of filling the nectar trough 110, the downwardly depending member 120 resides fully within the cavity 128 formed by the cover 114 and the support surface 126. The length of the downwardly depending member 120 is configured to be equal to or, preferably, shorter than the height of the cavity 128. The height of the cavity 128 and the length of the downwardly depending member 120 can be adjusted relative to each other to ensure that the downwardly depending member 120 does not bottom out against the support surface 126. In FIG. 10, a bottom view of the base 102 resting on the cover 114 is shown to illustrate that the downwardly depending member 120 is residing substantially within the cavity 128 formed inside the cover 114.

As illustrated in detail above, the base 102 rests securely on the top of the cover 114. This permits the base 102, with a non-flat bottom surface 118, and its nectar trough 110 to be held in a substantially level condition during the filling to avoid spilling and to maximize the amount that can be filled into the nectar trough 110. Furthermore, as can be seen in FIG. 10, the communication of the bottom surface 118 of the base 102 and the top surface of the cover 114 form a ball and socket-like connection where the positioning of the base 102 on the cover 114 can be adjusted as desired. For example, the support surface 126 that is available may be slightly inclined, such as the ground near the feeder 100. In such an environment, the cover 114 can be placed on the non-level ground support surface 126 and the base 102 can be placed on the cover 114 as described above and then adjusted so it is level with the horizon even though the cover 114 is not. This enables smooth and easy filling in virtually all conditions.

The method of filling of the present invention can employ a bird feeder 100 that has many different types of configurations with different types of non-flat bottom surfaces 118. The feeder 100 itself is typically made of plastic but can be made of virtually any type of material. Further, the annular-shaped feeder 100 discussed herein is just one example of many configurations of feeders that can be accommodated by the method of filling of the present invention. For example, the center aperture 124 through the cover may be square instead of round. Also, the downwardly depending member 120 may be integrated into the molding of the base 102 or attached as a separate member.

In general, the method of the present invention employs the cover 114 of a feeder 100 to serve as a custom stand during re-filling of nectar 112 into a nectar trough 110 in a base 102 that has a custom non-flat bottom surface 118.

It would be appreciated by those skilled in the art that various changes and modifications can be made to the illustrated embodiments without departing from the spirit of the present invention. All such modifications and changes are intended to be covered by the appended claims.

What is claimed is:

1. A method of filling a nectar bird feeder, comprising the steps of:
   providing a base, having a bottom surface and a reservoir for containing nectar therein;
   providing an extension member downwardly depending from the bottom surface of the base;
   providing a cover, having an aperture, a top surface and lower edges, that is releasably attached to the base;
   removing the cover from releasable attachment to the base;
   placing the cover on a support surface with the lower edges of the cover in communication with the support surface;
   placing the base on the cover with the bottom surface of the base in communication with the top surface of the cover with the extension member being positioned through the aperture and located substantially between the top surface and the lower edges of the cover;
   filling the reservoir of the base with nectar;
   removing the base from the cover; and
   attaching the cover to the base.

2. The method of claim 1, wherein the cover releasably attaches to the base by a friction fit.

3. The method of claim 1, wherein the extension member is an ornamental member.

4. The method of claim 1, wherein the extension member is a stabilizing member.

5. The method of claim 1, wherein the base movably rests on the cover to enable leveling of the base for complete filling of the reservoir with nectar without spillage thereof.

6. The method of claim 1, further comprising the step of providing a hanger connected to the base and extending upwardly therefrom.

7. The method of claim 6, wherein the hanger is removably connected to the base.

8. A method of filling a nectar bird feeder, comprising the steps of:
   providing a base, having a bottom surface, a central portion, and a trough-shaped reservoir positioned about the central portion for containing nectar therein;
   providing an extension member downwardly depending from the bottom surface of the base;
   providing an annular-shaped cover, having a top surface and lower edges, that is releasably attached to the base and co-extensive with the trough of the base with an aperture therein;
   removing the cover from releasable attachment to the base;
   placing the cover on a support surface with the lower edges of the cover in communication with the support surface;
   placing the base on the cover with the bottom surface of the base in communication with the top surface of the cover with the extension member being positioned through the aperture and located substantially between the top surface and the lower edges of the cover;
   filling the reservoir of the base with nectar;
   removing the base from the cover; and
   attaching the cover to the base.

9. The method of claim 8, wherein the cover releasably attaches to the base by a friction fit.

10. The method of claim 8, wherein the extension member is an ornamental member.

11. The method of claim 8, wherein the extension member is a stabilizing member.

12. The method of claim 8, wherein the base movably rests on the cover to enable leveling of the base for complete filling of the reservoir with nectar without spillage thereof.

13. The method of claim 8, further comprising the step of providing a hanger connected to the central portion of the base and extending upwardly therefrom.

14. The method of claim 13, wherein the hanger is removably connected to the base.

* * * * *